US012240132B2

(12) United States Patent
Klaseboer et al.

(10) Patent No.: US 12,240,132 B2
(45) Date of Patent: Mar. 4, 2025

(54) REDUCING SOUND PRODUCTION IN A HAIR-CUTTING UNIT COMPRISING AN EXTERNAL CUTTING MEMBER AND A ROTATABLE INTERNAL CUTTING MEMBER

(71) Applicant: KONINKLIJKE PHILIPS N.V., Eindhoven (NL)

(72) Inventors: Gerrit Klaseboer, Steenwijk (NL); Redmer Van Tijum, Tolbert (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 321 days.

(21) Appl. No.: 17/917,047

(22) PCT Filed: Apr. 13, 2021

(86) PCT No.: PCT/EP2021/059481
§ 371 (c)(1),
(2) Date: Oct. 5, 2022

(87) PCT Pub. No.: WO2021/209406
PCT Pub. Date: Oct. 21, 2021

(65) Prior Publication Data

US 2023/0158693 A1 May 25, 2023

(30) Foreign Application Priority Data

Apr. 14, 2020 (EP) .................................... 20169374

(51) Int. Cl.
*B26B 19/14* (2006.01)

(52) U.S. Cl.
CPC .......... *B26B 19/143* (2013.01); *B26B 19/141* (2013.01)

(58) Field of Classification Search
CPC ...... B26B 19/143; B26B 19/141; B26B 19/14
(Continued)

(56) References Cited

U.S. PATENT DOCUMENTS 4,635,360 A 1/1987 Tanahashi
2003/0070304 A1 4/2003 Curello
(Continued)

FOREIGN PATENT DOCUMENTS

CN 101767341 B 5/2013
CN 205521524 U 8/2016
(Continued)

OTHER PUBLICATIONS

International Search Report and Written Opinion Dated Aug. 2, 2021 for International Application No. PCT/EP2021/059481 Filed Apr. 13, 2021.

*Primary Examiner* — Phong H Nguyen

(57) ABSTRACT

In an external cutting member (10) which is configured to be used in a hair-cutting unit in combination with a rotatable internal cutting member, a base (11) includes at least one hair-cutting track (21) which is provided with a plurality of hair-entry openings, and an annular base portion (31) located between a central portion (17) of the base (11) and an innermost one of the at least one hair-cutting track (21). The annular base portion (31) is provided with a profiled section which is located between a straight inner section (32) and a straight outer section (33) of the annular base portion (31), which is annular about a central axis (16) of the external cutting member (10), and which is shaped according to a predefined profile, seen in a cross-section of the external cutting member (10) comprising the central axis (16).

14 Claims, 4 Drawing Sheets

(58) Field of Classification Search
USPC ........................................ 30/43.4, 43.5, 43.6
See application file for complete search history.

(56) References Cited

U.S. PATENT DOCUMENTS

| | | | | |
|---|---|---|---|---|
| 2007/0113408 | A1* | 5/2007 | Okabe | B26B 19/141 30/346.51 |
| 2011/0308088 | A1* | 12/2011 | Brada | B26B 19/14 30/43.6 |
| 2015/0082637 | A1* | 3/2015 | Liu | B26B 19/143 30/43.6 |
| 2017/0028575 | A1* | 2/2017 | Yu | B26B 19/3893 |
| 2017/0217030 | A1 | 8/2017 | Mimura | |

FOREIGN PATENT DOCUMENTS

| | | | |
|---|---|---|---|
| WO | 03033221 | A1 | 4/2003 |
| WO | 2015124000 | A1 | 8/2015 |
| WO | 2016091750 | A1 | 6/2016 |
| WO | 2017/220360 | A1 | 12/2017 |

* cited by examiner

Fig. 1
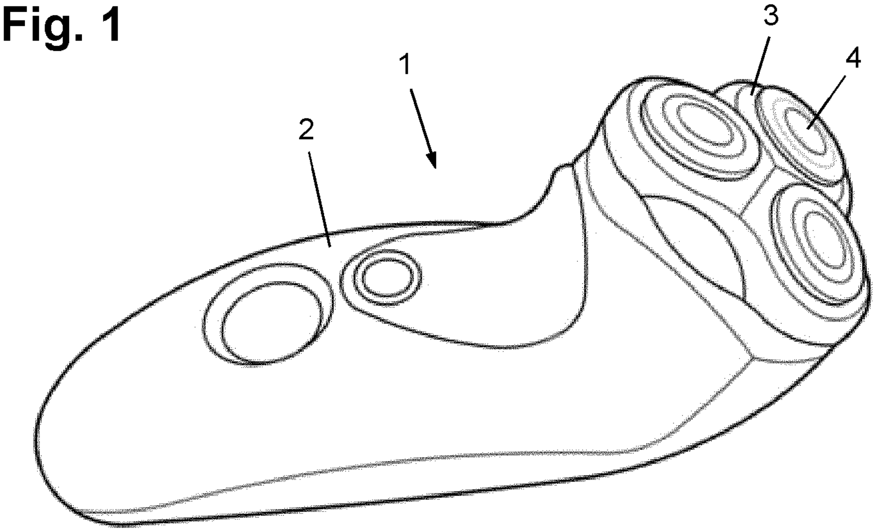
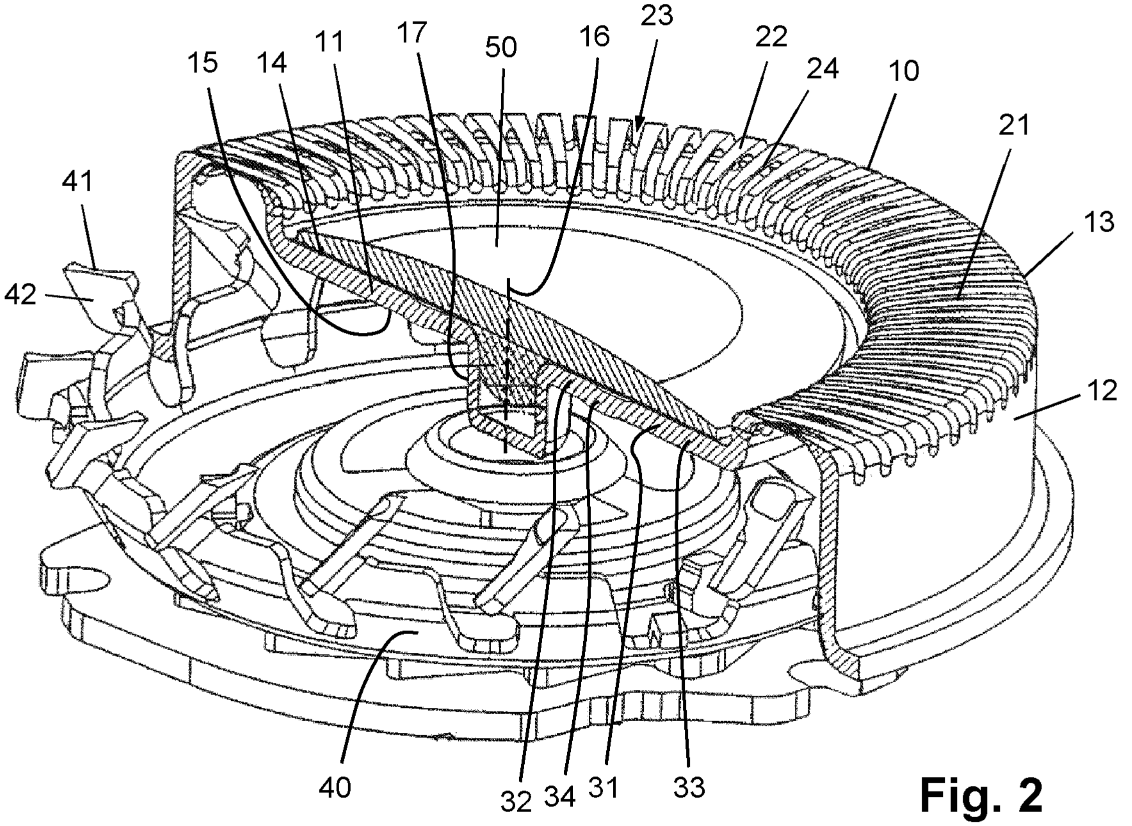
Fig. 2

Fig. 3
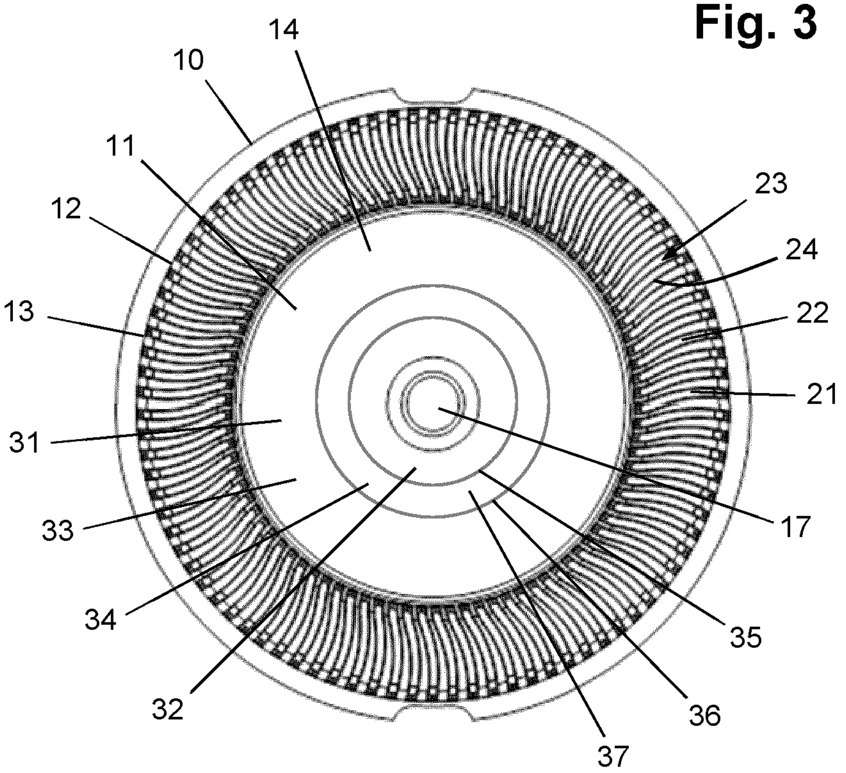
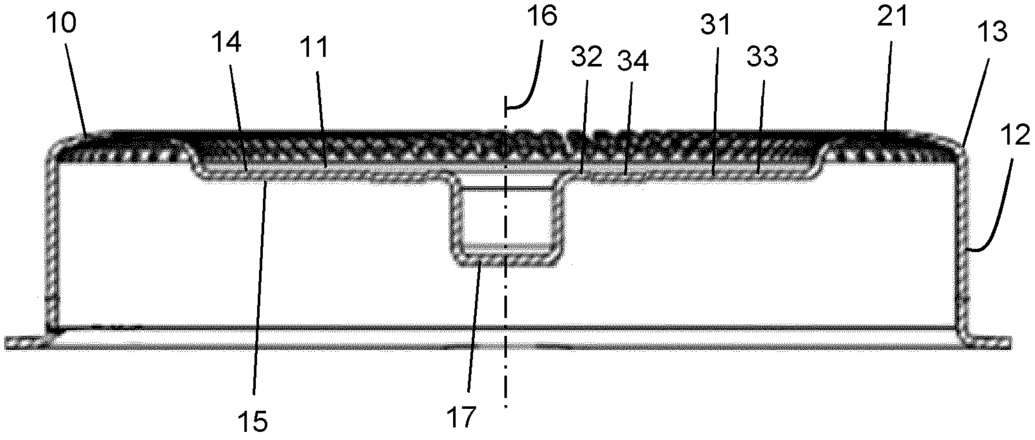
Fig. 4

Fig. 5
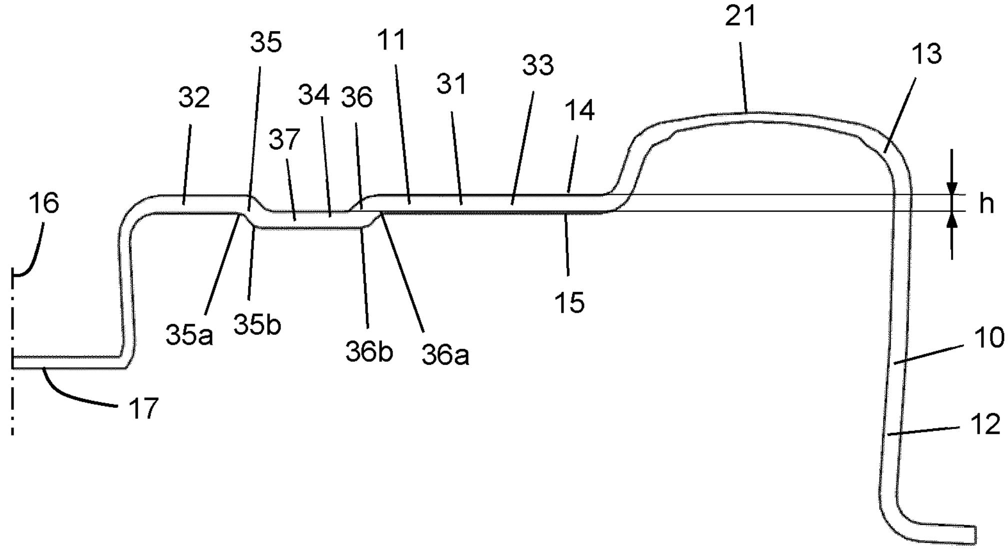
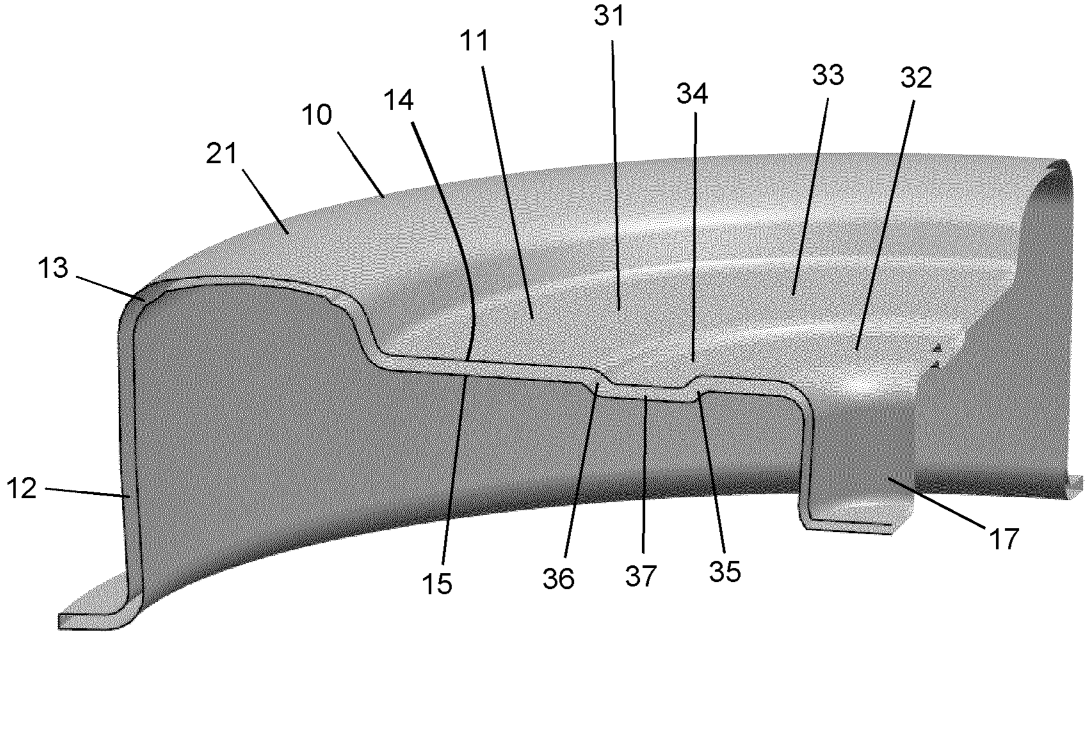
Fig. 6

Fig. 7
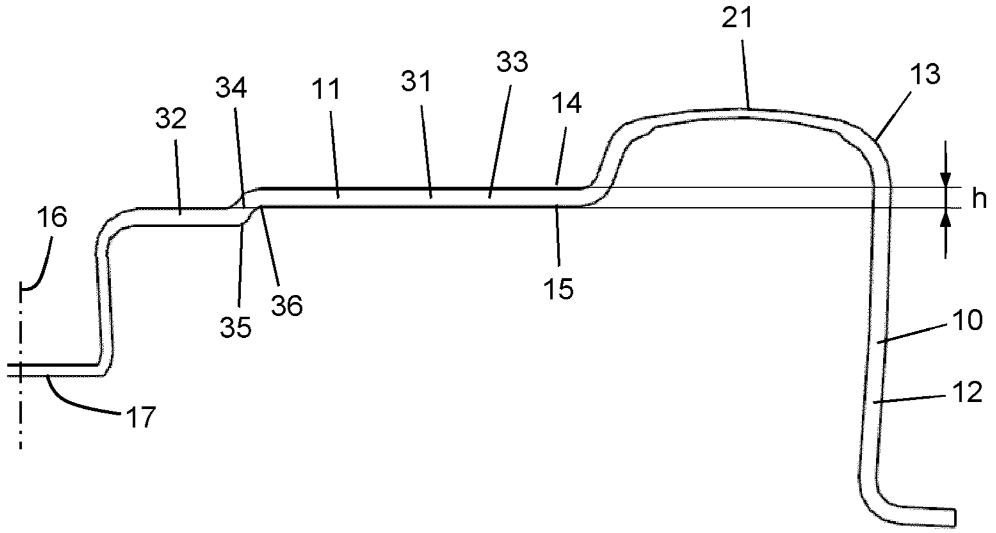
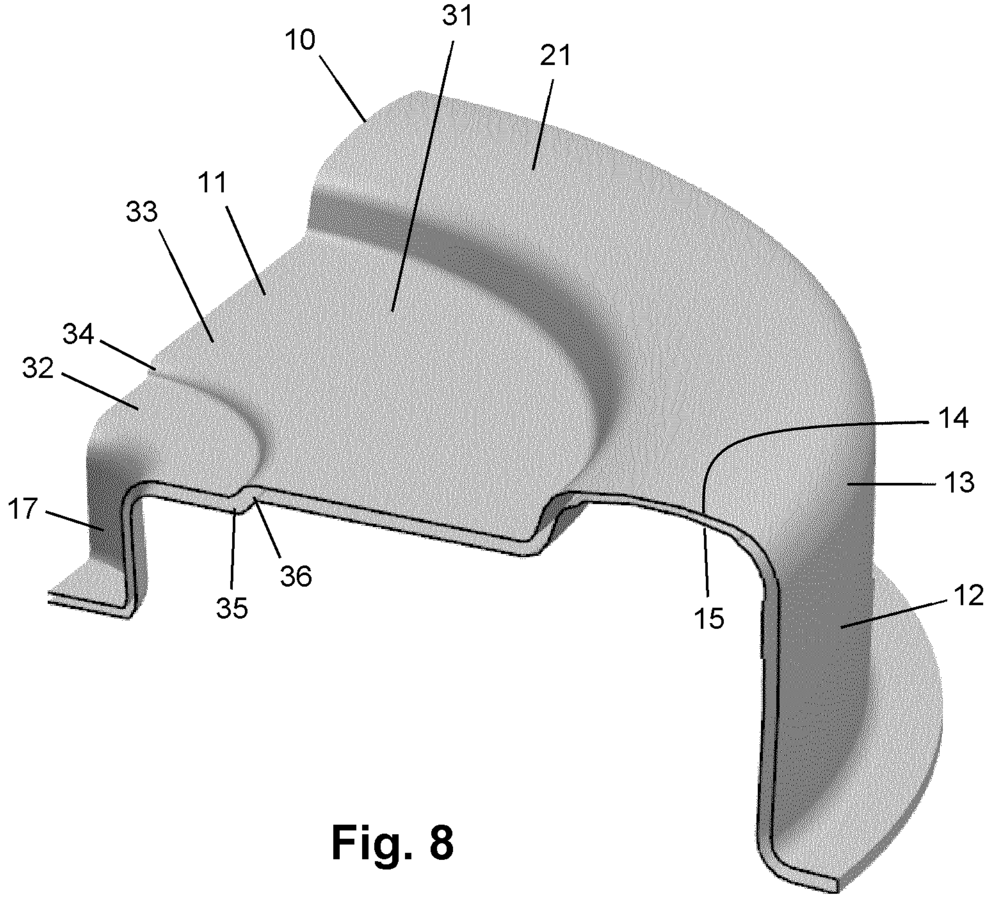
Fig. 8

REDUCING SOUND PRODUCTION IN A HAIR-CUTTING UNIT COMPRISING AN EXTERNAL CUTTING MEMBER AND A ROTATABLE INTERNAL CUTTING MEMBER

CROSS REFERENCE TO RELATED APPLICATIONS

This application is the U.S. National Phase application under 35 U.S.C. § 371 of International Application No. PCT/EP2021/059481 filed Apr. 13, 2021, which claims the benefit of European Patent Application Number 20169374.4 filed Apr. 14, 2020. These applications are hereby incorporated by reference herein.

FIELD OF THE INVENTION

The invention relates to an external cutting member which is configured to be used in a hair-cutting unit in combination with a rotatable internal cutting member having at least one hair-cutting edge for the purpose of subjecting a portion of skin to a hair-cutting action, wherein the external cutting member is generally cup-shaped and comprises a base and an annular wall extending from a circumferential area of the base, wherein, at an exterior side thereof, the base has an exterior base surface configured to face the portion of skin to be subjected to a hair-cutting action, and at an interior side thereof, the base has an interior base surface configured to face the internal cutting member, and wherein the base includes at least one hair-cutting track which is annular about a central axis of the external cutting member and provided with a plurality of hair-entry openings, and an annular base portion located between a central portion of the base and an innermost one of the at least one hair-cutting track which is closest to the central axis.

Further, the invention relates to a hair-cutting unit comprising an external cutting member as described here before and a rotatably arranged internal cutting member having at least one hair-cutting edge, wherein the external cutting member is arranged in the hair-cutting unit to cover the internal cutting member.

Still further, the invention relates to a hair-cutting appliance comprising at least one hair-cutting unit as described here before and a mechanism configured to drive the internal cutting member of the at least one hair-cutting unit.

BACKGROUND OF THE INVENTION

The invention is in the field of hair-cutting appliances, particularly electric hair-cutting appliances which are designed to perform shaving actions and the like in which hairs are cut at a position close to the skin. In general, a hair-cutting appliance comprises a head where one or more hair-cutting units are located. A particularly common design uses three hair-cutting units in an equilateral triangular configuration. Each hair-cutting unit comprises a combination of an internal cutting member and an external cutting member which is arranged to cover the internal cutting member, the external cutting member being provided with a series of hair-entry openings for allowing hairs to reach through the external cutting member and encounter the internal cutting member during a hair-cutting action. In a practical design, the external cutting member is generally cup-shaped and has a substantially circular periphery, wherein the hair-entry openings may be shaped like elongated slits extending substantially radially with respect to a central axis of the external cutting member, in one or more annular areas making up one or more hair-cutting tracks. Such an external cutting member is particularly suitable to be used in a hair-cutting appliance of the rotary type, i.e. a hair-cutting appliance including at least one hair-cutting unit in which the internal cutting member is arranged so as to rotate during operation.

Proper use of the hair-cutting appliance involves putting the appliance to an active state, i.e. a state in which the internal cutting member of the at least one hair-cutting unit is rotated, and moving the head over a portion of skin to be subjected to a hair-cutting action. The external cutting member has a hair-cutting track surface for contacting a portion of skin at the position of the one or more hair-cutting tracks during a hair-cutting action. At positions where the hair-entry openings are delimited, hair-cutting surfaces are present in the external cutting member. In a common design, the internal cutting member includes blades having hair-cutting edges. During a hair-cutting action, hairs entering the hair-entry openings are sheared between the hair-cutting surfaces and the hair-cutting edges, and get cut off at a position close to the skin as a result thereof.

In the cup-shaped design of the external cutting member, the external cutting member comprises a base and an annular wall extending from a circumferential area of the base, wherein at an exterior side thereof, the base has an exterior base surface configured to face the portion of skin to be subjected to a hair-cutting action, and at an interior side thereof, the base has an interior base surface configured to face the internal cutting member. The one or more hair-cutting tracks are located at the base. The base further includes an annular base portion located between a central portion of the base and an innermost one of the hair-cutting tracks, i.e. the hair-cutting track which is closest to the central axis of the external cutting member seen in a radial direction relative to the central axis, and which is simply the hair-cutting track in case of a single hair-cutting track. The central portion of the base may comprise a central bearing portion configured to be used in rotationally supporting the internal cutting member, for example, in which case it is practical if the central portion comprises a centrally located recess in the base, which recess may further serve to mount a decorative cover element configured to cover part of the exterior base surface.

A commonly known manufacturing method of the external cutting member involves providing a sheet of metal and subjecting the sheet to various processes, including deformation processes such as cold-forming processes. In the field of hair-cutting appliances, it is desirable to have developments aimed at reducing a sheet thickness of the sheet as mentioned, for example to a value of 200 μm, because processing a sheet with a sheet thickness closer to intended final thicknesses of various portions of the sheet may take less manufacturing steps and less energy. However, it appears that reducing the sheet thickness of the sheet from which the external cutting member is made influences vibrational behavior of the external cutting member.

A notable aspect of vibrational behavior of the external cutting member resides in the fact that when the external cutting member is used in a hair-cutting unit and the internal cutting member is rotated, interaction of the internal cutting member with the hair-cutting surfaces of the one or more hair-cutting tracks of the external cutting member causes the external cutting member to vibrate. A frequency of vibrations of the external cutting member is related to a frequency at which the respective hair-cutting edges of the internal cutting member pass the hair-cutting surfaces of the one or more hair-cutting tracks of the external cutting member. The design of the hair-cutting unit is normally chosen so as to keep the vibrations of the external cutting member at an acceptable level. However, design aspects will not do much when the frequency of the vibrations of the external cutting member turns out to be close to the eigenfrequency of the external cutting member. It appears that when the sheet thickness of the sheet from which the external cutting member is made is reduced, there is an actual risk that the frequency of vibrations of the external cutting member following from rotation of the internal cutting member comes close to the eigenfrequency of the external cutting member. If that happens, indeed, a noticeable sound is produced during the time that the internal cutting member is rotated, which is not appreciated by users.

SUMMARY OF THE INVENTION

It is an object of the invention to alleviate the problem addressed in the foregoing, i.e. the problem of production of noticeable sound following from vibrations of the external cutting member caused by a rotating internal cutting member, which is particularly relevant when it is desired to reduce the sheet thickness of the sheet from which the external cutting member is made, as explained earlier.

In view of the foregoing, the invention provides an external cutting member which is configured to be used in a hair-cutting unit in combination with a rotatable internal cutting member having at least one hair-cutting edge for the purpose of subjecting a portion of skin to a hair-cutting action, wherein the external cutting member is generally cup-shaped and comprises a base and an annular wall extending from a circumferential area of the base, wherein, at an exterior side thereof, the base has an exterior base surface configured to face the portion of skin to be subjected to a hair-cutting action, and at an interior side thereof, the base has an interior base surface configured to face the internal cutting member, and wherein the base includes at least one hair-cutting track which is annular about a central axis of the external cutting member and provided with a plurality of hair-entry openings, and an annular base portion located between a central portion of the base and an innermost one of the at least one hair-cutting track which is closest to the central axis, wherein, seen in a cross-section of the external cutting member comprising the central axis, the annular base portion is provided with a profiled section which is located between a straight inner section and a straight outer section of the annular base portion, which is annular about the central axis, and which is shaped according to a predefined profile, wherein the profiled section comprises a first bent connection zone at a location of connection to the straight inner section and a second bent connection zone at a location of connection to the straight outer section, and wherein, in an axial direction parallel to the central axis, the predefined profile of the profiled section involves an axial height difference of at least one of the exterior base surface and the interior base surface of at least 80 μm over a radial measuring distance in the profiled section of at most 800 μm in a radial direction relative to the central axis.

According to the invention, the problem addressed in the foregoing is alleviated when adjustments are made to the design of the external cutting member, particularly to the design of the base of the external cutting member. The invention involves an insight that the annular base portion which is located between a central portion of the base and the innermost one of the at least one hair-cutting track which is closest to the central axis may act like a membrane when the external cutting member is vibrating and may thereby be involved in sound production to a significant extent. By providing the annular base portion with the profiled section defined in the foregoing, the conventional concept of having, in the cross-section of the external cutting member, an overall straight appearance of the annular base portion is abandoned, as a result of which a reduced or increased stiffness of the annular base portion is realized. On the basis thereof, the eigenfrequency of the external cutting member is reduced or increased, and the appearance of the profiled section may be chosen such that this is done to such an extent that there is practically no longer a risk that the eigenfrequency is in a range of frequencies of vibrations of the external cutting member following from use of the external cutting member with an internal cutting member rotating at a rotation speed which is appropriate in the context of a hair-cutting action.

It follows from the foregoing that the invention involves adjusting the stiffness of the annular base portion so that the eigenfrequency of the external cutting member is reduced or increased, wherein a beneficial effect on sound perception by users is obtained by choosing an appropriate appearance of the profiled section of the annular base portion. By applying the invention in a context of an external cutting member made from a sheet having a sheet thickness of 200 μm, for example, the level of sound resulting from vibrations of the external cutting member caused by a rotating internal cutting member may be as acceptable as in a context of an external cutting member made from a sheet having a larger sheet thickness such as a sheet thickness of 350 μm or an even higher value. The invention does not necessitate any drastic measures, because the design of the external cutting member is changed in a subtle manner only, so that hair-cutting performance is not compromised and there is no need for adjusting the design of other components of a hair-cutting unit such as the internal cutting member. Implementing the adjusted appearance of the annular base portion can simply be done by changing one step in the sheet deformation process which is performed in the manufacturing process of the external cutting member. After such step has taken place, the slightly different shape of the annular base portion should be taken into account, but doing so does not require a change of the nature of the process.

As indicated in the foregoing, the predefined profile of the profiled section involves an axial height difference of at least one of the exterior base surface and the interior base surface of at least 80 μm over a radial measuring distance in the profiled section of at most 800 μm, so that a useful adjustment of the eigenfrequency can be obtained on the basis of the adjustment of the conventional overall straight appearance of the annular base portion in the cross-section of the external cutting member. The axial height difference of at least one of the exterior base surface and the interior base surface may be between 80 and 150 μm over the radial measuring distance in the profiled section of at most 800 μm, for example. The axial height difference as mentioned of, respectively, the exterior base surface and the interior base surface is to be understood so as to be a distance in the axial direction which is present, in the cross-section of the external cutting member, between two points on, respectively, the exterior base surface and the interior base surface which are furthest remote from each other in the axial direction.

The invention also covers cases in which the axial height difference of at least one of the exterior base surface and the interior base surface is at least 130 μm over a radial measuring distance in the profiled section of at most 650 μm.

In such cases, the axial height difference of at least one of the exterior base surface and the interior base surface may be between 130 and 200 μm over the radial measuring distance in the profiled section of at most 650 μm, for example.

In a practical embodiment of the external cutting member, seen in the above-mentioned cross-section of the external cutting member, an outline of the exterior base surface and an outline of the interior base surface correspond to each other, at least at the position of the profiled section. Referring to a dimension of the base measured between the interior base surface and the exterior base surface in the axial direction as thickness of the base, this implies that the thickness of the base is substantially constant over the profiled section, which may be a logical consequence of the manufacturing process of the external cutting member if the external cutting member is of a sheet-based design as suggested earlier and the sheet used in the process has been subjected to bending actions. In such a practical case, the predefined profile of the profiled section involves both an axial height difference of the exterior base surface of at least 80 μm and an axial height difference of the interior base surface of at least 80 μm over the radial measuring distance in the profiled section of at most 800 μm.

In practical cases, it may be so that at the position of at least a major part of the profiled section, the base is further indented in the axial direction towards the interior side of the base than at the position of the straight outer section. When it is defined that the exterior base surface is at a higher level than the interior base surface, this implies that at least a major part of the profiled section is at a lower level than the straight outer section. This does not alter the fact that the invention also covers cases in which this is the other way around, i.e. in which at the position of at least a major part of the profiled section, the base is further indented in the axial direction towards the exterior side of the base than at the position of the straight outer section.

According to a first option existing in the framework of the invention, the predefined profile of the profiled section is shaped as a U, wherein the profiled section comprises an intermediate zone at a location between the first and second bent connection zones, and wherein each of the first and second bent connection zones of the profiled section comprises two oppositely bent parts. In such a case, it may be practical if at the position of the intermediate zone of the profiled section, the base is further indented in the axial direction towards the interior side of the base than at the positions of both the first bent connection zone of the profiled section at the location of connection to the straight inner section and the second bent connection zone of the profiled section at the location of connection to the straight outer section, in other words, if the U shape is up in an orientation of the external cutting member in which the exterior base surface faces upwardly and the interior base surface faces downwardly.

According to a second option existing in the framework of the invention, the predefined profile of the profiled section is shaped as a horizontally stretched S. In such a case, it may be practical if at the position of the first bent connection zone of the profiled section, the base is further indented in the axial direction towards the interior side of the base than at the position of the second bent connection zone of the profiled section. In this way, the profiled section may fit well in an overall slanting design of the annular base portion from a higher position at the side of the innermost one of the at least one hair-cutting track to a lower position at the side of the central portion of the base.

As known from the prior art, a practical option in respect of the appearance of the central portion of the base is an appearance in which the central portion comprises a centrally located recess in the base. According to another option, a central hole may be present in the central portion of the base, which is suitable for receiving some kind of pin, shaft-like element or the like. Further, as suggested earlier, it is very well possible to manufacture the external cutting member from a sheet, in which case the external cutting member can be defined as comprising a deformed sheet, wherein a sheet thickness of 200 μm is an example of a suitable initial sheet thickness of such a sheet.

The above-described and other aspects of the invention will be apparent from and elucidated with reference to the following detailed description of practical embodiments of an external cutting member for use in a hair-cutting unit of a hair-cutting appliance.

BRIEF DESCRIPTION OF THE DRAWINGS

The invention will now be explained in greater detail with reference to the figures, in which equal or similar parts are indicated by the same reference signs, and in which:

FIG. 1 diagrammatically shows a perspective view of a hair-cutting appliance according to the invention including a head in which three hair-cutting units according to the invention are located, FIG. 2 diagrammatically shows a perspective view of a combination of an external cutting member according to the invention, a decorative cap positioned on the external cutting member, and an internal cutting member, which combination is part of a hair-cutting unit of the hair-cutting appliance shown in FIG. 1, wherein both the external cutting member and the cap are shown with a portion cut away, FIG. 3 diagrammatically shows a top view of the external cutting member of the combination shown in FIG. 2, FIG. 4 diagrammatically shows a sectional view of the external cutting member of the combination shown in FIG. 2, FIG. 5 diagrammatically shows a cross-section of a portion of an external cutting member according to a first embodiment of the invention, the cross-section comprising a central axis of the external cutting member, FIG. 6 diagrammatically shows a perspective view of a cut-out piece of the external cutting member according to the first embodiment of the invention, FIG. 7 diagrammatically shows a cross-section of a portion of an external cutting member according to a second embodiment of the invention, the cross-section comprising a central axis of the external cutting member, and FIG. 8 diagrammatically shows a perspective view of a cut-out piece of the external cutting member according to the second embodiment of the invention.

DETAILED DESCRIPTION OF THE EMBODIMENTS

FIG. 1 shows a shaving appliance of the rotary type as a practical example of a hair-cutting appliance 1 according to the invention. The hair-cutting appliance 1 comprises a body 2 which is intended to be taken hold of by a user of the hair-cutting appliance 1, and a head 3 which is intended to contact a portion of skin to be subjected to a hair-cutting action. The body 2 of the hair-cutting appliance 1 is also commonly referred to as handle. For various reasons such as a need to service and/or clean the head 3, a need to replace the head 3 by a head of another type, etc., it is practical if the head 3 is removably or hingably mounted to the body 2. The head 3 includes a number of hair-cutting units 4 according to the invention, the number being three in the shown example. When the hair-cutting appliance 1 is applied for the purpose of subjecting a portion of skin to a hair-cutting action, the actual process of cutting off hairs protruding from the portion of skin takes place at the position of the hair-cutting units 4.

Each of the hair-cutting units 4 comprises a combination of an external cutting member 10 and an internal cutting member 40, as will now be described in more detail with reference to FIGS. 2-4. The external cutting member 10 is of a generally cup-shaped design, comprising a base 11 having a substantially circular periphery and an annular wall 12 extending from a circumferential area 13 of the base 11, whereby the external cutting member 10 is suitable for at least partially accommodating the internal cutting member 40 in its interior. At an exterior side thereof, the base 11 has an exterior base surface 14 configured to face the portion of skin to be subjected to a hair-cutting action, and at an interior side thereof, the base 11 has an interior base surface 15 configured to face the internal cutting member 40.

An annular hair-cutting track 21 is present in the base 11 of the cup-shaped design of the external cutting member 10, which hair-cutting track 21 comprises lamellae 22 extending along the width of the hair-cutting track 21, in a substantially radial direction relative to a central axis 16 of the external cutting member 10. Apertures as present between the lamellae 22 constitute hair-entry openings 23 of the hair-cutting track 21. Sides of the lamellae 22 constitute hair-cutting surfaces 24 suitable for cutting off hairs in cooperation with hair-cutting edges 41 of hair-cutting elements 42 of the internal cutting member 40. The invention also relates to cases in which the hair-cutting track 21 does not comprise lamellae 22 or does not only comprise lamellae 22, such as cases in which the entire hair-cutting track 21 is provided with teeth-like elements and/or a pattern of (circular) holes instead of or in addition to lamellae 22. Also, the invention relates to cases in which more than one hair-cutting track 21 is present in the base 11.

A hair-cutting action can be performed when the internal cutting member 40 is activated to rotate and a portion of skin is actually contacted by the external cutting member 10 at the position of the hair-cutting track 21. Activation of the internal cutting member 40 may take place in a known manner by means of a drive mechanism of the hair-cutting appliance 1, which is not shown in the figures. When the combination of the external cutting member 10 and the internal cutting member 40 is moved over the portion of skin while the internal cutting member 40 is driven to rotate, it is achieved that hairs protruding from the portion of skin are caught in the hair-entry openings 23 of the hair-cutting track 21 of the external cutting member 10 and are cut off in that position as result of a cooperation between the hair-cutting surfaces 24 of the hair-cutting track 21 of the external cutting member 10 and the hair-cutting edges 41 of the hair-cutting elements 42 of the rotating internal cutting member 40.

Besides the hair-cutting track 21, the base 11 includes a central portion 17 comprising a central bearing portion which is designed to be used in rotationally supporting the internal cutting member 40 in the hair-cutting unit 4. The central portion 17 of the base 11 also serves for supporting a decorative cap 50 configured to cover part of the exterior base surface 14. In the shown example, the central portion 17 comprises a centrally located recess in the base 11, and the cap 50 comprises a projection which is accommodated in the recess.

Further, the base 11 includes an annular base portion 31 located between the hair-cutting track 21 and the central portion 17. Seen in a cross-section of the external cutting member 10 including the central axis 16, the annular base portion 31 comprises a straight inner section 32, a straight outer section 33, and a profiled section 34 located between the straight inner section 32 and the straight outer section 33. The profiled section 34 is annular about the central axis 16 and shaped according to a predefined profile. At one side, the profiled section 34 is connected to the straight inner section 32 of the annular base portion 31 through a first bent connection zone 35, and at another side, the profiled section 34 is connected to the straight outer section 33 of the annular base portion 31 through a second bent connection zone 36.

In the following, details of a first example appearance of the predefined profile of the profiled section 34 will be explained with reference to FIGS. 5 and 6, and details of a second example appearance of the predefined profile of the profiled section 34 will be explained with reference to FIGS. 7 and 8. For the sake of simplicity, details of the hair-cutting track 21 of the external cutting member 10 are not shown in FIGS. 6 and 8.

In the first example, the predefined profile of the profiled section 34 is shaped as a U, wherein the profiled section 34 comprises an intermediate zone 37 at a location between the first and second bent connection zones 35, 36, and wherein each of the first and second bent connection zones 35, 36 of the profiled section 34 comprises two oppositely bent parts 35*a*, 35*b*, 36*a*, 36*b*. During the manufacturing process of the external cutting member 10, the U-shaped profile of the profiled section 34 is obtained by subjecting a sheet from which the external cutting member 10 is made to an appropriate deformation process by using deforming components with an appropriate outline and supporting components on the sheet. In the shown example, the U-shaped profile is obtained by indenting the sheet in an axial direction parallel to the central axis 16 towards the interior side of the base 11. As a result, the base 11 ends up being further indented in the axial direction towards the interior side of the base 11 at the position of the intermediate zone 37 of the profiled section 34 than at the position of both the first bent connection zone 35 of the profiled section 34 at the location of connection to the straight inner section 32 and the second bent connection zone 36 of the profiled section 34 at the location of connection to the straight outer section 33.

In the second example, the predefined profile of the profiled section 34 is shaped as a horizontally stretched S. During the manufacturing process of the external cutting member 10, the stretched S-shaped profile of the profiled section 34 is obtained by subjecting a sheet from which the external cutting member 10 is made to an appropriate deformation process by using deforming components with an appropriate outline and supporting components on the sheet. In the shown example, the stretched S-shaped profile is obtained by indenting the sheet in the axial direction towards the interior side of the base 11. As a result, the base 11 ends up being further indented in the axial direction towards the interior side of the base 11 at the position of the first bent connection zone 35 of the profiled section 34 than at the position of the second bent connection zone 36 of the profiled section 34.

In FIGS. 5 and 7, an axial height difference of the exterior base surface 14 in the predefined profile of the profiled section 34 is indicated as h. In the example case of the U-shaped profile of the profiled section 34 as shown, an overall axial height difference h of the exterior base surface 14 is between a first extreme level of the exterior base surface 14 at the position of the intermediate zone 37 and a second extreme level of the exterior base surface 14 at the position of the second bent connection zone 36 at the location of connection to the straight outer section 33. In the example case of the stretched S-shaped profile of the profiled section 34 as shown, an overall axial height difference h of the exterior base surface 14 is between a first extreme level of the exterior base surface 14 at the position of the first bent connection zone 35 at the location of connection to the straight inner section 32 and a second extreme level of the exterior base surface 14 at the position of the second bent connection zone 36 at the location of connection to the straight outer section 33. In the shown examples, the axial height difference h of the interior base surface 15 in the predefined profile of the profiled section 34 is similar to the axial height difference h of the exterior base surface 14 in the predefined profile of the profiled section 34, because a thickness of the external cutting member 10 is basically the same at every position.

Due to the presence of the profiled section 34 in the annular base portion 31, the stiffness of the annular base portion 31 is different from the stiffness of a conventional annular base portion 31 of overall straight appearance in a cross-section of the external cutting member 10. The stiffness can be determined by determining a force-displacement characteristic in respect of force exerted on the base 11 in the axial direction, towards the interior side of the base 11. It appears from tests that when compared to the conventional base portion, the annular base portion 31 comprising the profiled section 34 of U-shaped profile has a reduced stiffness and the annular base portion 31 comprising the profiled section 34 of stretched S-shaped profile has an increased stiffness. In either case, the properties of the external cutting member 10 are improved as far as production of noticeable sound following from vibrations of the external cutting member 10 is concerned, which vibrations are invoked by rotational motion of the internal cutting member 40 and other operational aspects. The stiffness of a conventional straight annular base portion 31 is more likely to involve a situation in which a frequency of such invoked vibrations of the external cutting member 10 is close to an eigenfrequency of the external cutting member 10, in which case noticeable sound is produced. By changing the stiffness through changing the appearance of the profiled section 34, it is achieved that the eigenfrequency is changed so that the frequency of the invoked vibrations of the external cutting member 10 is further away from the eigenfrequency of the external cutting member 10. Good results of this measure are obtained when the predefined profile of the profiled section involves an axial height difference h of at least one of the exterior base surface 14 and the interior base surface 15 of at least 80 μm over a radial measuring distance in the profiled section 34 of at most 800 μm in a radial direction relative to the central axis 16. In this respect, it is noted that a practical example of a thickness of the external cutting member at the position of the at least one hair-cutting track is less than 100 μm, that a practical example of a diameter of the central portion 17 of the base 11 is 2.5 mm, that a practical example of an inner diameter of the hair-cutting track 21 is 14 mm, and that a practical example of an outer diameter of the hair-cutting track 21 is 21 mm.

In the case of the stretched S-shaped profile as shown in FIGS. 7 and 8, the predefined profile of the profiled section may involve an axial height difference h of at least one of the exterior base surface 14 and the interior base surface 15 of about 100 μm over the above-mentioned radial measuring distance in the profiled section 34 of at most 800 μm. In the case of the U-shaped profile as shown in FIGS. 5 and 6, the predefined profile of the profiled section may have somewhat steeper zones and may involve an axial height difference h of at least one of the exterior base surface 14 and the interior base surface 15 of about 150 μm over a radial measuring distance in the profiled section 34 of at most 650 μm. It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of'. Hence, the term "comprise" or "include" may in respect of an embodiment mean "consist of", but may in another embodiment mean "contain/have/be equipped with at least the defined species and optionally one or more other species".

The invention claimed is:

1. An external cutting member which is configured to be used in a hair-cutting unit in combination with a rotatable internal cutting member having at least one hair-cutting edge for the purpose of subjecting a portion of skin to a hair-cutting action, wherein the external cutting member is generally cup-shaped and comprises a base and an annular wall extending from a circumferential area of the base, wherein, at an exterior side thereof, the base has an exterior base surface configured to face the portion of skin to be subjected to a hair-cutting action, and at an interior side thereof, the base has an interior base surface configured to face the internal cutting member, wherein the base includes at least one hair-cutting track which is annular about a central axis of the external cutting member and provided with a plurality of hair-entry openings, and an annular base portion located between a central portion of the base and an innermost one of the at least one hair-cutting track which is closest to the central axis, wherein, seen in a cross-section of the external cutting member comprising the central axis, the annular base portion is provided with a profiled section which is located between a straight inner section and a straight outer section of the annular base portion, which is annular about the central axis, and which is shaped according to a predefined profile, wherein the profiled section comprises a first bent connection zone at a location of connection to the straight inner section and a second bent connection zone at a location of connection to the straight outer section, and wherein, in an axial direction parallel to the central axis, the predefined profile of the profiled section involves an axial height difference of at least one of the exterior base surface and the interior base surface of at least 80 μm over a radial measuring distance in the profiled section of at most 800 μm in a radial direction relative to the central axis.

2. The external cutting member according to claim 1, wherein the predefined profile of the profiled section involves an axial height difference of at least one of the exterior base surface and the interior base surface of between 80 and 150 μm over the radial measuring distance in the profiled section of at most 800 μm.

3. The external cutting member according to claim 1, wherein the predefined profile of the profiled section involves an axial height difference of at least one of the exterior base surface and the interior base surface of at least 130 μm over a radial measuring distance in the profiled section of at most 650 μm.

4. The external cutting member according to claim 3, wherein the predefined profile of the profiled section involves an axial height difference of at least one of the exterior base surface and the interior base surface of between 130 and 200 μm over the radial measuring distance in the profiled section of at most 650 μm.

5. The external cutting member according to claim 1, wherein, seen in said cross-section of the external cutting member, an outline of the exterior base surface and an outline of the interior base surface correspond to each other, at least at the position of the profiled section.

6. The external cutting member according to claim 1, wherein, at the position of at least a major part of the profiled section, the base is further indented in the axial direction towards the interior side of the base than at the position of the straight outer section.

7. The external cutting member according to claim 1, wherein the predefined profile of the profiled section is shaped as a U, wherein the profiled section comprises an intermediate zone at a location between the first and second bent connection zones, and wherein each of the first and second bent connection zones of the profiled section comprises two oppositely bent parts.

8. The external cutting member according to claim 7, wherein, at the position of the intermediate zone of the profiled section, the base is further indented in the axial direction towards the interior side of the base than at the positions of both the first bent connection zone of the profiled section at the location of connection to the straight inner section and the second bent connection zone of the profiled section at the location of connection to the straight outer section.

9. The external cutting member according to claim 1, wherein the predefined profile of the profiled section is shaped as a horizontally stretched S.

10. The external cutting member according to claim 9, wherein, at the position of the first bent connection zone of the profiled section, the base is further indented in the axial direction towards the interior side of the base than at the position of the second bent connection zone of the profiled section.

11. The external cutting member according to claim 1, wherein the central portion of the base comprises a central bearing portion configured to be used in rotationally supporting the internal cutting member.

12. The external cutting member according to claim 1, comprising a deformed sheet having a thickness of less than 100 μm at the position of the at least one hair-cutting track.

13. A hair-cutting unit, comprising an external cutting member according to claim 1 and a rotatably arranged internal cutting member having at least one hair-cutting edge, wherein the external cutting member is arranged in the hair-cutting unit to cover the internal cutting member.

14. A hair-cutting appliance, comprising at least one hair-cutting unit according to claim 13 and a mechanism configured to drive the internal cutting member of the at least one hair-cutting unit.

* * * * *